(12) United States Patent
Nakagawa (10) Patent No.: US 12,403,923 B2
(45) Date of Patent: Sep. 2, 2025

(54) DRIVING SUPPORT SYSTEM FOR VEHICLE TO ASSIST A DRIVER VIA NOTIFICATIONS

(71) Applicant: TOYOTA JIDOSHA KABUSHIKI KAISHA, Toyota (JP)

(72) Inventor: Yuki Nakagawa, Toyota (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 212 days.

(21) Appl. No.: 18/101,800

(22) Filed: Jan. 26, 2023

(65) Prior Publication Data

US 2023/0294721 A1  Sep. 21, 2023

(30) Foreign Application Priority Data

Mar. 17, 2022 (JP) ................................ 2022-042556

(51) Int. Cl.
*B60W 50/08* (2020.01)
*B60W 40/02* (2006.01)

(52) U.S. Cl.
CPC ............ *B60W 50/08* (2013.01); *B60W 40/02* (2013.01); *B60W 2554/80* (2020.02)

(58) Field of Classification Search
CPC ... B60W 50/08; B60W 40/02; B60W 2554/80
See application file for complete search history.

(56) References Cited

U.S. PATENT DOCUMENTS

| | | | |
|---|---|---|---|
| 10,919,449 B2* | 2/2021 | Shimomura | B60W 30/143 |
| 12,091,003 B1* | 9/2024 | Akella | B60W 30/0956 |
| 2017/0166115 A1* | 6/2017 | Pal | B60Q 5/005 |
| 2022/0252402 A1* | 8/2022 | Shimada | G08G 1/096816 |
| 2023/0021000 A1* | 1/2023 | Okonogi | B60W 10/04 |

FOREIGN PATENT DOCUMENTS

| | | | |
|---|---|---|---|
| JP | 2001-347853 A | | 12/2001 |
| JP | 2020120715 A | * | 8/2020 |
| KR | 10-2021-0047333 A | | 4/2021 |
| WO | 2020/086127 A1 | | 4/2020 |

OTHER PUBLICATIONS

English translation of JP-2020120715-A (Year: 2020).*

* cited by examiner

*Primary Examiner* — Todd Melton
*Assistant Examiner* — Matthew Ho
(74) *Attorney, Agent, or Firm* — Dinsmore & Shohl LLP (57) ABSTRACT

A driving support system for a vehicle includes an external information receiving unit that acquires information including position information of an obstacle, and a processor that notifies a driver of the presence of the obstacle when the obstacle is present within a predetermined range from the vehicle, based on peripheral information of the vehicle, determines, when a plurality of obstacles is present within the predetermined range, whether an inter-obstacle distance between a first obstacle that is closest to the vehicle from among the obstacles, and a second obstacle other than the first obstacle is smaller than a first predetermined distance that is set in advance, and performs control for restricting a notification of the presence of the second obstacle to the driver when the inter-obstacle distance is smaller than the first predetermined distance.

6 Claims, 6 Drawing Sheets

DRIVING SUPPORT SYSTEM FOR VEHICLE TO ASSIST A DRIVER VIA NOTIFICATIONS

CROSS-REFERENCE TO RELATED APPLICATION

This application claims priority to Japanese Patent Application No. 2022-042556 filed on Mar. 17, 2022, incorporated herein by reference in its entirety.

BACKGROUND

1. Technical Field

The present disclosure relates to a driving support system for a vehicle using communication technology, and more particularly to a driving support system for a vehicle that assists driving by notifying a driver of peripheral information obtained by vehicle-to-vehicle communication, road-to-vehicle communication, or the like.

2. Description of Related Art

In Japanese Unexamined Patent Application Publication No. 2001-347853 (JP 2001-347853 A), a display device configured to support driving by acquiring traveling environment information such as traffic jams and frozen road surfaces in front of a vehicle (in a travel direction) and obstacle information on a road through road-to-vehicle communication and notifying a driver and passengers is described. In the display device described in JP 2001-347853 A, it is determined whether a vehicle is traveling in a specific environment, such as a traffic light installation point or an intersection with poor visibility, in which a driver must look in a direction (right or left, and the like) different from a direction in which the vehicle is traveling to check safety. Then, when it is determined that the vehicle is traveling in a specific environment when displaying the traveling environment information and the obstacle information on an information display, the display device is configured to restrict the display of such information on the information display. Further, in the device of JP 2001-347853 A, when the traveling environment information and the obstacle information exist within a set distance or a predetermined distance from a subject vehicle, it is configured to notify the driver by displaying the information on an information display mounted on an upper part of an instrument panel of the vehicle or issuing an alarm from an alarm device.

SUMMARY

However, changes in the traveling environment and obstacles on the road as described above occur irregularly and may occur continuously. In such a case, in the device described in JP 2001-347853 A that uniformly notifies a driver of the changes in the traveling environment or the obstacles on the road according to a distance between the subject vehicle and the obstacle, the driver will be notified whenever an obstacle comes within a predetermined distance from the vehicle. Further, in the device described in JP 2001-347853 A, when the vehicle is traveling in the specific environment described above, it is configured to restrict the display of information such as the traveling environment and obstacles on the information display, or to notify by issuing an alarm depending on the traveling environment and the distance to the obstacle. Therefore, when information on the traveling environment and obstacles is mixed or continuous on the road, or when the subject vehicle travels or passes through a specific environment, there is a possibility that notifications relating to traveling environment information and obstacle information will be issued in a complicated manner or restricted. In such a case, the driver may feel uncomfortable by the notification, or the driver may not be able to obtain accurate information, causing confusion.

The present disclosure provides a driving support system for a vehicle that allows a driver to appropriately recognize peripheral information without feeling uncomfortable.

A driving support system according to an aspect of the present disclosure includes an external information receiving unit and a processor. The external information receiving unit is configured to acquire information including position information of an obstacle that obstructs traffic. The processor is configured to notify a driver of a presence of the obstacle when the obstacle is present within a predetermined range from the vehicle, based on peripheral information of the vehicle, determine, when a plurality of obstacles is present within the predetermined range, whether an inter-obstacle distance between a first obstacle that is closest to the vehicle from among the obstacles, and a second obstacle other than the first obstacle is smaller than a first predetermined distance that is set in advance, and perform control for restricting a notification of a presence of the second obstacle to the driver when the inter-obstacle distance is smaller than the first predetermined distance.

In the aspect, the driving support system may have a reference distance smaller than the predetermined range, the reference distance serving as a reference for starting a detailed notification of the presence of the obstacles to the vehicle, may be provided. The first predetermined distance may be smaller than the reference distance.

In the aspect, the processor may continue a constant notification even after the vehicle passes the first obstacle and end the constant notification before the vehicle reaches the second obstacle.

In the aspect, the processor may determine, when a distance between the first obstacle and the second obstacle is equal to or greater than the first predetermined distance, whether the distance is smaller than a second predetermined distance, and control, when the distance between the first obstacle and the second obstacle is equal to or greater than the first predetermined distance and smaller than the second predetermined distance, a notification informing the driver of the presence of the first obstacle and a notification informing the driver of the presence of the second obstacle such that the notifications are seamlessly continuous.

In the aspect, the second predetermined distance may be a distance greater than the reference distance. When the distance between the first obstacle and the second obstacle is equal to or greater than the first predetermined distance and smaller than the second predetermined distance, the processor may perform control for continuing a notification even after the notification regarding the first obstacle ends until the notification regarding the second obstacle starts, such that the notifications are seamlessly continuous.

In the aspect, the external information receiving section may acquire a fact that the first obstacle and the second obstacle are present due to the same event. The processor may determine whether the inter-obstacle distance is smaller than the second predetermined distance, and restrict the notification of the presence of the second obstacle when the first obstacle and the second obstacle are present due to the same event and the inter-obstacle distance is smaller than the second predetermined distance.

In the aspect, the first obstacle may be a first stopped vehicle that is parked and can communicate with the vehicle, and the second obstacle may be a second stopped vehicle that is parked and can communicate with the vehicle. The processor may acquire information including position information from each of the first stopped vehicle and the second stopped vehicle through vehicle-to-vehicle communication.

In the aspect, the processor may emit an alarm as the notification from a speaker.

In the aspect, the processor may display an indication as the notification on a display device. The indication may include a distance to the obstacle.

The driving support system for the vehicle of the present disclosure acquires information about obstacles existing around the vehicle and determines obstacles existing within a predetermined range of the vehicle that may hinder the vehicle from traveling. When there is a plurality of obstacles, it is determined whether the distance between a predetermined obstacle closest to the vehicle and another obstacle among the obstacles is smaller than the first predetermined distance. Then, when the distance between the predetermined obstacle and another obstacle is smaller than the first predetermined distance, it is configured to notify the driver of the presence of the predetermined obstacle and to restrict notification to the driver of the presence of another obstacle. In other words, the notification of the presence of another obstacle appearing in front of the vehicle in the travel direction after the predetermined obstacle is omitted or a different notification is given, so it is possible to avoid frequent notifications about the obstacles. Therefore, since necessary notifications for the driver are made and notifications deemed unnecessary are regulated, it is possible to suppress or avoid the driver feeling annoyance at the notification or erroneously recognizing the information about the obstacle. As a result, appropriate driving assistance can be provided to the driver.

Further, in the driving support system for the vehicle of the present disclosure, even after the vehicle has passed the predetermined obstacle, the constant notification is continued, and the constant notification is ended before reaching another obstacle. For example, when the driver cannot visually recognize the presence of another obstacle when passing through the predetermined obstacle, the driver may feel uncomfortable because no notification is issued even when the vehicle approaches another obstacle. With this configuration, by continuing the constant notification for a while even after passing through the predetermined obstacle, the driver can recognize that there are still obstacles other than the predetermined obstacle, so the occurrence of such a situation can be avoided or suppressed.

Further, in the driving support system for the vehicle of the present disclosure, when the distance between the predetermined obstacle and another obstacle is equal to or greater than the first predetermined distance and smaller than the second predetermined distance, both the presence of the predetermined obstacle and the presence of another obstacle are notified and it is controlled so that these notifications are seamlessly continuous. Therefore, even when both the presence of the predetermined obstacle and the presence of another obstacle are notified due to the distance between the obstacles, the notification can be made so that the driver does not feel uncomfortable. As a result, it is possible to suppress or avoid the driver feeling annoyance at the notification or erroneously recognizing the information about the obstacle.

In the driving support system for the vehicle, when the predetermined obstacle and another obstacle are present due to the same event, even when the distance between the predetermined obstacle and another obstacle is equal to or greater than the first predetermined distance, when the distance is smaller than the second predetermined distance, the notification of the presence of another obstacle is restricted. Even when the distance between the predetermined obstacle and another obstacle is large to some extent, when the driver recognizes that the events are the same, the notification of the presence of another obstacle may rather cause the driver to feel uncomfortable. Such discomfort to the driver can be suppressed or avoided by regulating the notification regarding the presence of another obstacle.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Hereinafter, the present disclosure will be described based on an embodiment illustrated in the drawings. The embodiment described below is merely an example of when the present disclosure is embodied, and does not limit the present disclosure.

First, an example of the configuration of a driving support system 1 according to the embodiment of the present disclosure will be described with reference to FIG. 1. In the driving support system 1 in the embodiment of the present disclosure, a vehicle 2 configured to be able to communicate with other vehicles via a network communicates with a first stopped vehicle 3 stopped in front of the vehicle 2 in a travel direction and a second stopped vehicle 4 further in front of the first stopped vehicle 3 in the travel direction. The vehicle 2 includes an in-vehicle device 5 that is an information processing device that processes information acquired through vehicle-to-vehicle communication and outputs commands to devices mounted on the vehicle 2. The first stopped vehicle 3 and the second stopped vehicle 4 are also each equipped with an information processing device (not illustrated), and are configured to be capable of vehicle-to-vehicle communication with the in-vehicle device 5 of the vehicle 2. These are configured to perform vehicle-to-vehicle communication (V2V) using, for example, known mobile communication, narrowband communication, wireless communication, or short-range communication. The first stopped vehicle 3 corresponds to a predetermined obstacle and a predetermined stopped vehicle in the embodiment of the present disclosure, and the second stopped vehicle 4 corresponds to other obstacles and other stopped vehicles in the embodiment of the present disclosure.

Figure 2:
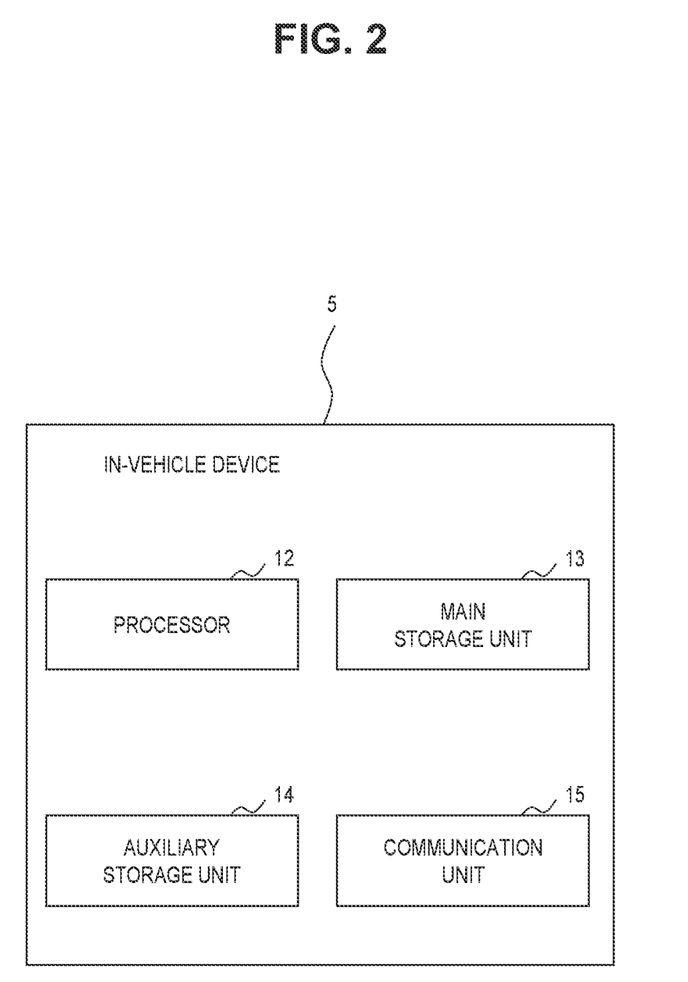
FIG. 2 is a block diagram for illustrating a configuration of an in-vehicle device.
Figure 3:
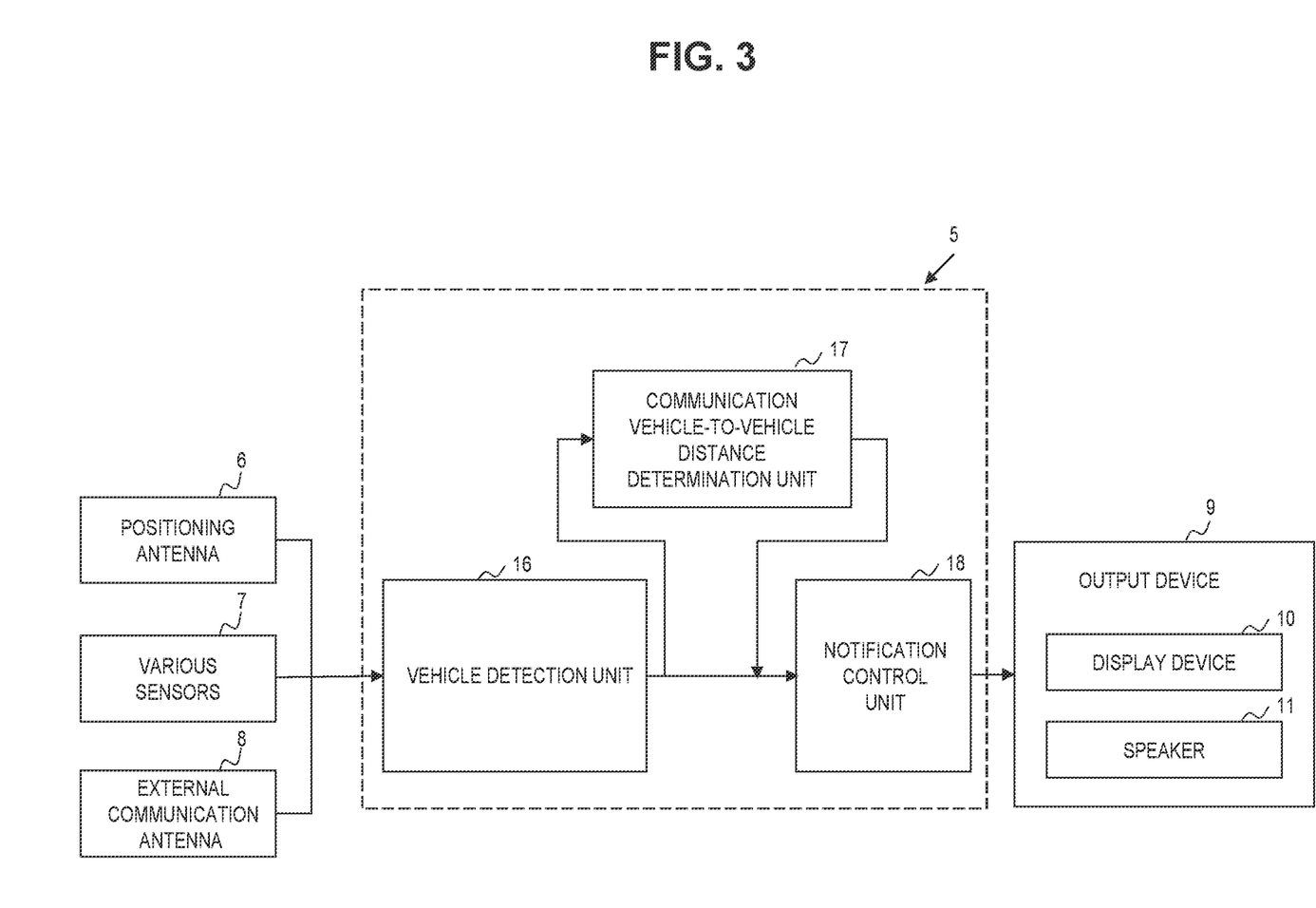
FIG. 3 is a block diagram for illustrating a functional configuration of a vehicle and the in-vehicle device according to an embodiment of the disclosure.

Further, the vehicle 2 acquires various pieces of information on traffic on the road from the outside and notifies the information to a driver of the vehicle 2, thereby transmitting information useful for driving and assisting the driver. Also, even when map information or the like is not stored in the vehicle 2, based on positional information such as coordinate data, obstacles existing around the vehicle 2 and in front of the vehicle 2 in the travel direction can be detected and specified to assist driving as described below. As illustrated in FIGS. 2 and 3, the vehicle 2 has a positioning antenna 6, various sensors 7, and an external communication antenna 8 as input units to the in-vehicle device 5, and an output device 9 as an output unit. The vehicle 2 may be an existing general vehicle such as an engine vehicle, an electric vehicle, a hydrogen vehicle, a hybrid vehicle, or a fuel cell vehicle.

The positioning antenna 6 is for receiving signals transmitted by, for example, a plurality of satellites at a receiver. The positioning antenna 6 receives signals necessary for acquiring position information and coordinate data of the vehicle 2 by a self-positioning function such as global positioning system (GPS) for estimating the current position.

The various sensors 7 are a general term for various sensors mounted on the vehicle 2 and are a group of sensors for detecting the traveling state of the vehicle 2 and the like. The various sensors 7 include, for example, a vehicle speed sensor, a wheel speed sensor, a steering angle sensor, an acceleration sensor, a brake sensor, an accelerator position sensor, a radar sensor, a lidar sensor, and a camera for capturing outside the vehicle.

The external communication antenna 8 is primarily an omnidirectional antenna for receiving information on traffic on the road from the outside. The external communication antenna 8 in the embodiment of the present disclosure is configured to be capable of transmitting and receiving signals between the vehicle 2 and other vehicles including the first stopped vehicle 3 and the second stopped vehicle 4. Through the external communication antenna 8, the vehicle 2 receives information such as the traveling state of the first stopped vehicle 3 and the second stopped vehicle 4 such as stopped, starting, acceleration, and travel direction, and the current position from each information processing device. Further, the traveling lane in which the first stopped vehicle 3 and the second stopped vehicle 4 are stopped and the aspect in which the vehicles are stopped are also acquired. From these pieces of information, the information helps for determining whether it is possible to avoid the stopped vehicles 3 and 4 while passing through them, or whether it is necessary to stop temporarily when the vehicle 2 approaches the first stopped vehicle 3 and the second stopped vehicle 4. The external communication antenna 8 corresponds to an external information receiving unit in the embodiment of the present disclosure. It determines the information sent by demodulating the received signal. Conversely, when transmitting a signal from the vehicle 2, information is modulated into a predetermined signal and transmitted to a predetermined target.

The output device 9 is a device for notifying the driver and passengers of the vehicle 2 that there are obstacles on the road on which they are traveling. The output device 9 is composed of, for example, a display device 10 such as a display for recognizing notification contents, a speaker 11 for notifying by voice, and the like. The output device 9 may be a dedicated one having a function of notifying obstacles, or the like, but may also have a function as a car navigation that displays map information and guides a route to the destination. In addition, the output device 9 notifies occupants such as the driver of the existence of obstacles that may hinder travel within a predetermined range from the vehicle, and notifies the existence of obstacles to call occupants' attention.

Figure 1:
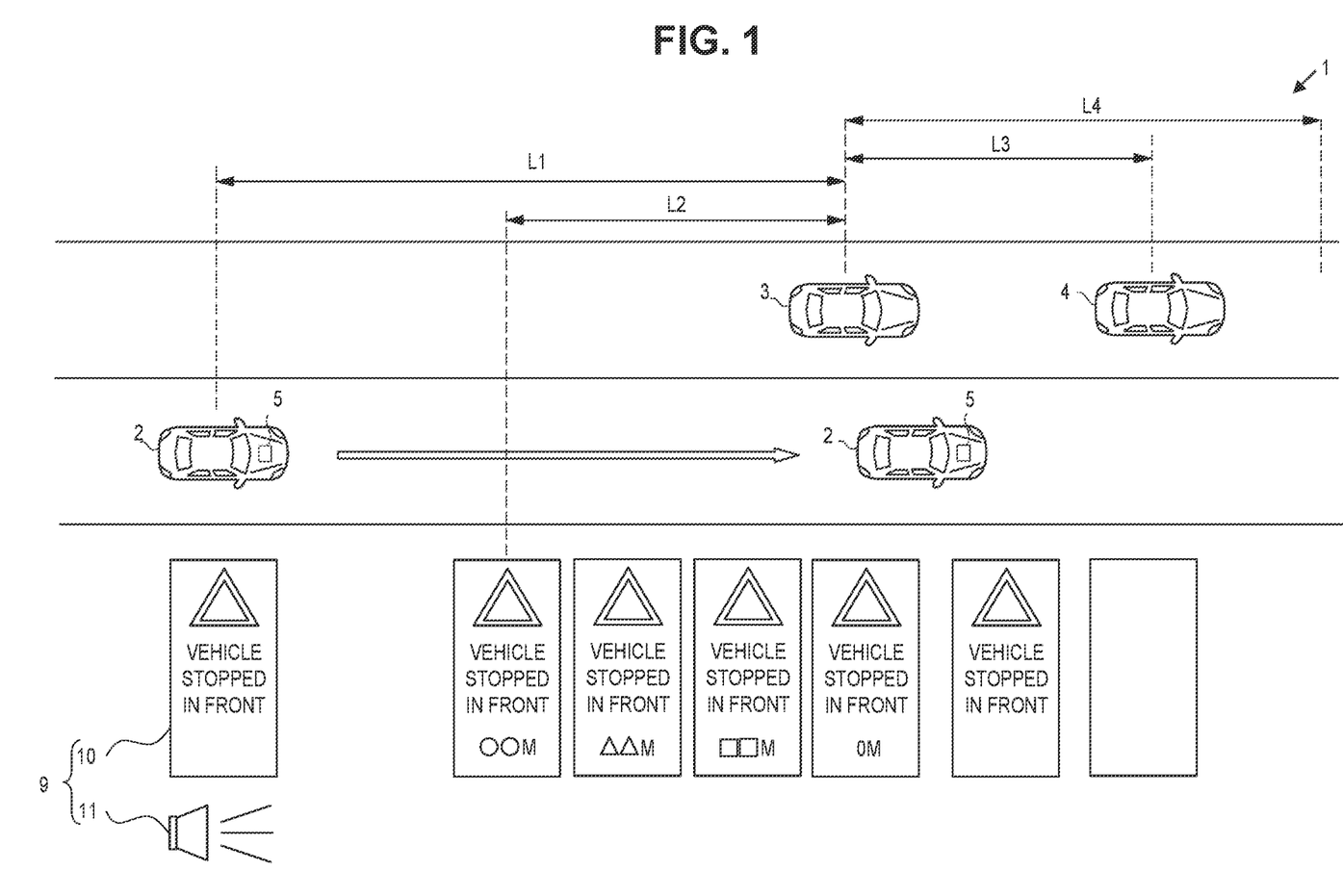
FIG. 1 is a view for illustrating an example of a notification to a driver in a driving support system for a vehicle according to an embodiment of the disclosure.

As an example, a warning such as a sound effect (notification sound) or a beep sound is emitted from the speaker 11, and marks, letters, and the distance to the obstacle as illustrated in FIG. 1 are displayed on the display device 10 to notify the driver and call the driver's attention. The marks are displayed on the display device 10 when an obstacle is detected within a predetermined range of the vehicle 2, and the marks may remain visible until the vehicle 2 reaches the obstacle or has completely passed the obstacle. Also, the effect sound or the beep sound may be emitted when an obstacle is detected, and may be output again to call attention when the distance to the obstacle becomes smaller. The display of the distance may start when the distance between the vehicle 2 and the obstacle is within a standard distance described below, and the number may be reduced, for example, every 50 meters, according to the distance to the obstacle. Also, such a notification to the driver may be either a display on the display device 10 or the like, or an effect sound or a beep sound emitted from the speaker 11. The notification by sound or display may be a plurality of types, and the driver may be notified by combining several sounds or displaying by combining different colors or marks. When displaying marks or the like on the display device 10, for example, an image processed by a processor 12, which will be described below, is displayed on the display device 10 using a graphic interface, or when outputting an effect sound or an alarm from the speaker 11, an audio signal generated by the processor may be subjected to predetermined signal processing and then output from the speaker 11.

The in-vehicle device 5 is, as illustrated in FIG. 2, a known information processing device having the processor 12, a main storage unit 13, an auxiliary storage unit 14, a communication unit 15, and the like. The in-vehicle device 5 in the embodiment of the present disclosure is a device in which the processor 12 loads a program stored in a recording medium into the working area of the main storage unit 13, executes the program, and performs various controls through the execution of the program to execute functions that meet a predetermined purpose.

The processor 12 is, for example, a central processing unit (CPU) or a digital signal processor (DSP). The processor 12 is configured to control the in-vehicle device 5 and perform various information processing operations.

The main storage unit 13 includes, for example, a random access memory (RAM) and a read only memory (ROM). In the main storage unit 13, as described above, a working area is formed for the processor 12 to execute the program.

The auxiliary storage unit 14 includes, for example, an erasable programmable ROM (EPROM) or a hard disk drive (HDD). This auxiliary storage unit 14 may include a so-called removable medium, which is a portable recording medium. The removable medium may be, for example, a universal serial bus (USB) memory, or a disc recording medium such as a compact disc (CD) or a digital versatile disc (DVD). In addition, the auxiliary storage unit 14 freely stores various programs, various data, and various tables in the recording medium by reading, writing, and so on. The auxiliary storage unit 14 may store an operating system (OS). Further, some or all of the information may be stored in the main storage unit 13. Conversely, information stored in the main storage unit 13 may be stored in the auxiliary storage unit 14.

The communication unit 15 is, for example, a wireless communication circuit for performing data communication with the first stopped vehicle 3 and the second stopped vehicle 4 using wireless communication. The wireless communication circuit performs vehicle-to-vehicle communication using mobile communication such as 5th generation (5G) or long term evolution (LTE). Further, the wireless communication circuit may perform vehicle-to-vehicle communication using narrowband communication such as dedicated short range communications (DSRC). Alternatively, the wireless communication circuit may perform vehicle-to-vehicle communication using wireless communication such as Wi-Fi, or may perform vehicle-to-vehicle communication using short-range communication such as Bluetooth (registered trademark) Low Energy (BLE).

A series of processes executed by the in-vehicle device 5 configured as described above may be executed not only by hardware but also by software. The information processing device mounted on each of the first stopped vehicle 3 and the second stopped vehicle 4 may be configured by an information processing device similar to the in-vehicle device 5. In that case, the vehicle 2, the first stopped vehicle 3, and the second stopped vehicle 4 can perform the vehicle-to-vehicle communication via each other's communication unit 15 to transmit and receive signals.

Next, functional configurations of the vehicle 2 and the in-vehicle device 5 according to the embodiment of the present disclosure will be described with reference to FIG. 3. As illustrated in FIG. 3, the in-vehicle device 5 includes a vehicle detection unit 16 that detects a vehicle stopping in front of a subject vehicle through communication, a communication vehicle-to-vehicle distance determination unit 17, and a notification control unit 18. The functions are executed, for example, by the processor 12.

The vehicle detection unit 16 detects that there is a stopped vehicle on the road in front of the vehicle 2 in the travel direction. The vehicle detection unit 16 acquires information on the current position of the vehicle 2 received by the positioning antenna 6, information on the traveling state of the vehicle 2 acquired by the various sensors 7, and information on the position information of other vehicles received by the external communication antenna 8. Then, from the information, the first stopped vehicle 3 and the second stopped vehicle 4, which are obstacles that are present in the travel direction of the vehicle 2 or on the route to be traveled and that may hinder the traveling of the vehicle 2, are detected.

Specifically, the vehicle detection unit 16 acquires the current position of the vehicle 2 from the positioning antenna 6, and detects the travel direction, vehicle speed, lane in which the vehicle 2 is traveling, and the like from the various sensors 7 and map data or the like stored in the main storage unit 13 or the auxiliary storage unit 14 of the in-vehicle device 5. Next, the vehicle detection unit 16 detects, from the information and the like on surrounding vehicles received by the external communication antenna 8, the first stopped vehicle that is stopped in front of the vehicle 2 in the travel direction and is closest to the vehicle 2, and detects the second stopped vehicle 4 that is the next closest to the vehicle 2 after the first stopped vehicle 3, which is an obstacle other than the first stopped vehicle 3. Then, the current position of the vehicle 2 and the position information of the first stopped vehicle 3 and the second stopped vehicle 4 that are stopped in front of the vehicle 2 in the travel direction are acquired, and other vehicles that may be obstacles to the vehicle 2 are detected.

Figure 4:
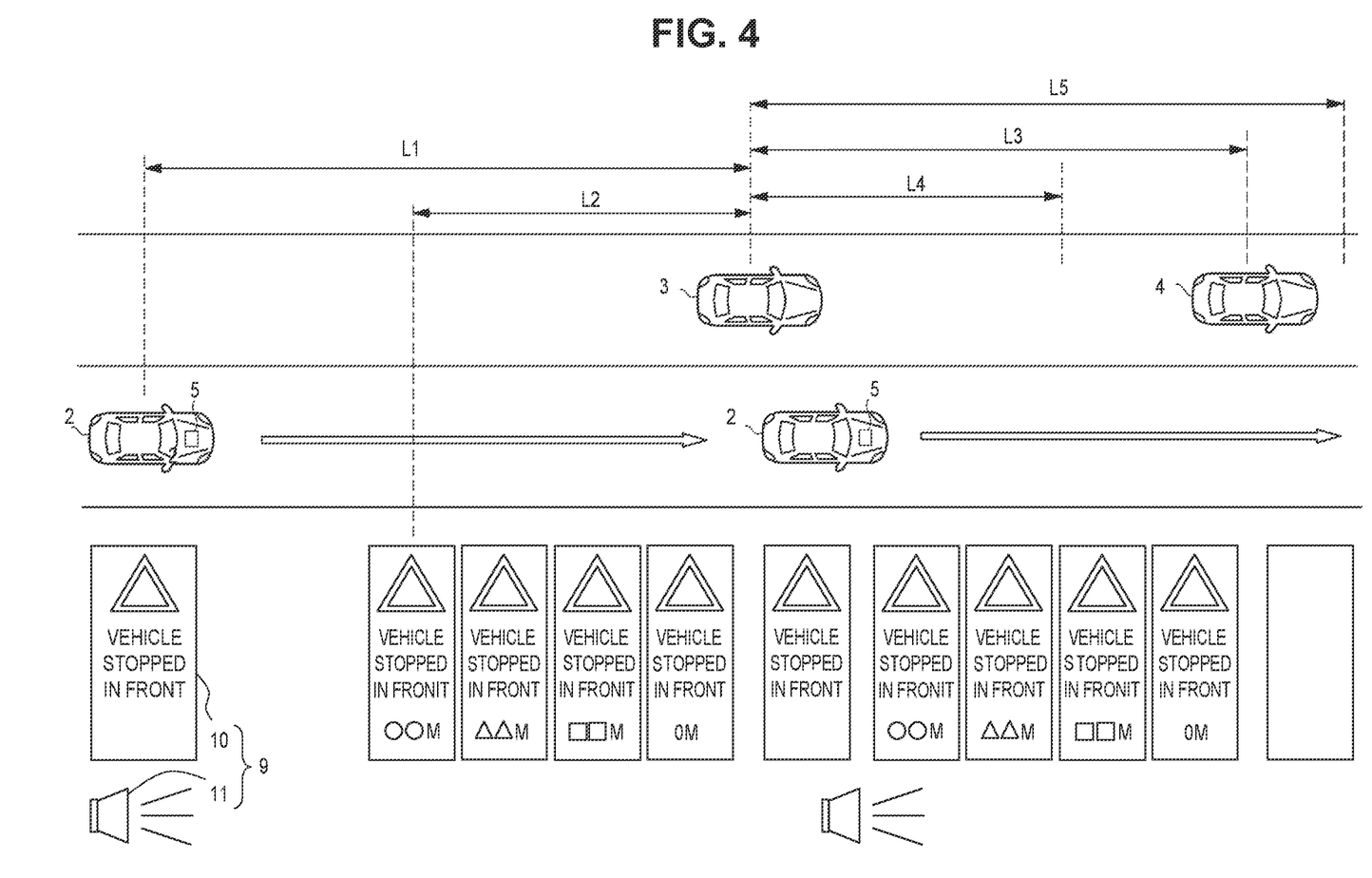
FIG. 4 is a view for illustrating another example of the notification to the driver in the driving support system for the vehicle according to an embodiment of the disclosure.
Figure 6:
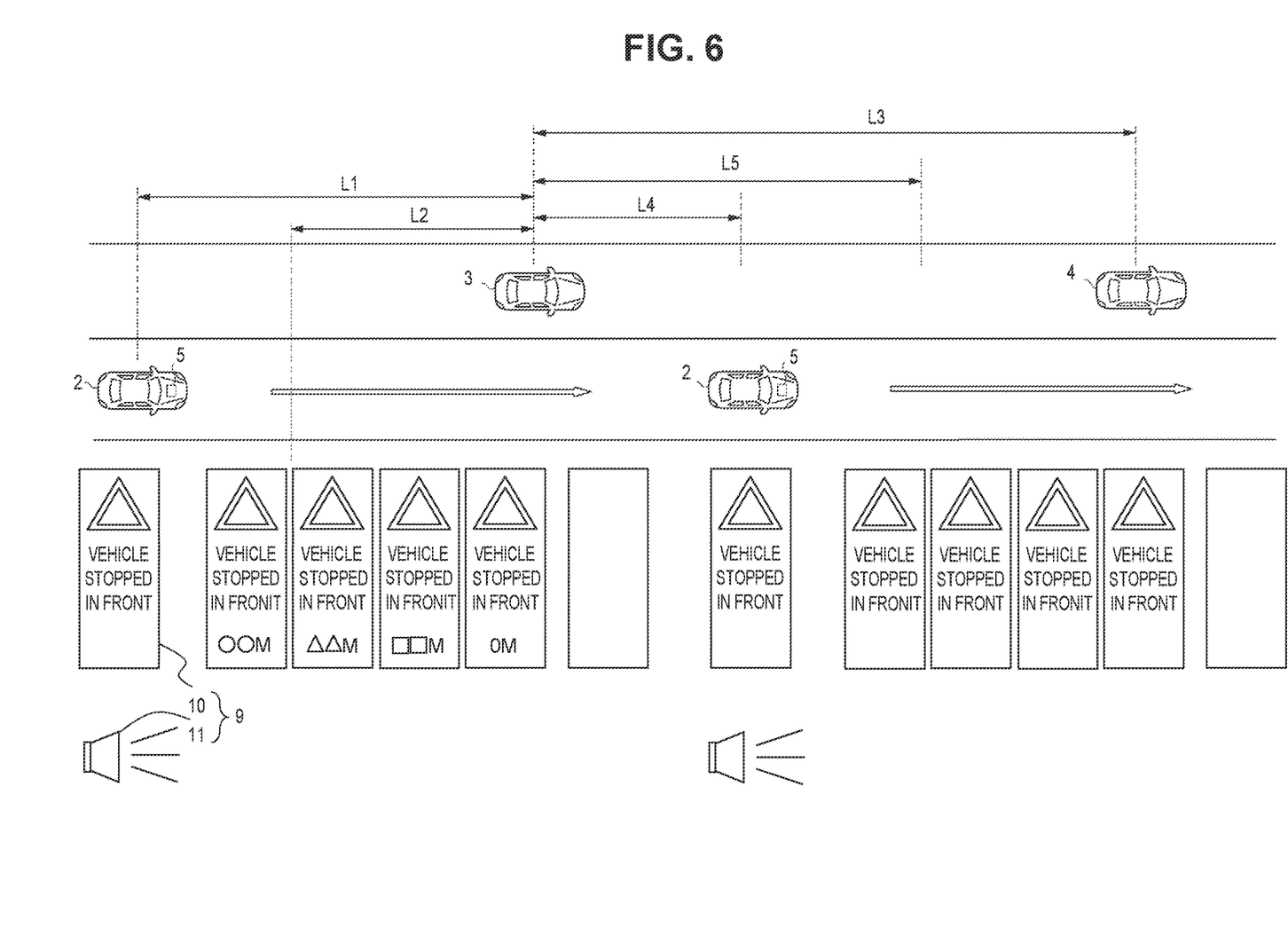
FIG. 6 is a view for illustrating a normal notification to the driver in the driving support system for the vehicle according to an embodiment of the disclosure.

Then, the vehicle detection unit 16 detects the presence of the first stopped vehicle 3 within a predetermined range of the vehicle 2 based on the acquired position information. When the first stopped vehicle 3 is within the predetermined range, the information is transmitted to the notification control unit 18. Further, the vehicle detection unit 16 calculates a first inter-vehicle distance L1 between the vehicle 2 and the first stopped vehicle 3. The calculated first inter-vehicle distance L1 is compared with a predetermined reference distance L2, and when the first inter-vehicle distance L1 is smaller than the reference distance L2, the fact is transmitted to the communication vehicle-to-vehicle distance determination unit 17 and the notification control unit 18. The reference distance L2 may be any distance, and is set to, for example, a distance that allows the driver to safely avoid the first stopped vehicle 3 without making sudden operations or to decelerate or stop the vehicle 2 when the driver while driving is notified of the presence of the first stopped vehicle 3 in front of the vehicle 2 in the travel direction from the output device 9. When the first stopped vehicle 3 is the only vehicle in front of the vehicle 2 in the travel direction that may hinder travel, the information about the first stopped vehicle 3 is sent only to the notification control unit 18. In addition, although there are other vehicles that are stopped, when there is no need to notify of them because they are further than the predetermined range, or when it is determined that the vehicles that are stopped are not likely to hinder the traveling of the vehicle 2 because it is in a different lane, the vehicle detection unit 16 determines that there is no vehicle to notify. In FIGS. 1, 4, and 6, the first inter-vehicle distance L1 is illustrated as a predetermined range in the embodiment of the present disclosure.

The communication vehicle-to-vehicle distance determination unit 17 calculates the inter-vehicle distance between the stopped vehicles when there is a plurality of stopped vehicles, compares the calculated inter-vehicle distance with a predetermined distance, and determines the length of the inter-vehicle distance. In particular, based on the position information of the first stopped vehicle 3 and the second stopped vehicle 4 acquired by the vehicle detection unit 16, a second inter-vehicle distance L3 between the first stopped vehicle 3 and the second stopped vehicle 4 is calculated. It is determined whether the calculated second inter-vehicle distance L3 is smaller than a predetermined first predetermined distance L4, which is a distance smaller than the reference distance L2. When it is determined that the second inter-vehicle distance L3 is smaller than the first predetermined distance L4, the fact is transmitted to the notification control unit 18. When it is determined that the second inter-vehicle distance L3 is greater than the first predetermined distance L4, The communication vehicle-to-vehicle distance determination unit 17 is configured to determine whether the distance is smaller than a second predetermined distance L5, and to transmit the determination result to the notification control unit 18 regardless of the result. In addition, in the embodiment of the present disclosure, the first predetermined distance L4 may be any distance, and is, for example, a distance that allows the driver to visually recognize the orientation, stop position, and the like of the second stopped vehicle 4 with certainty after passing the first stopped vehicle 3. Also, the second predetermined distance L5 may be any distance, and, for example, it is set to a distance that is greater than the first predetermined distance L4 and greater than the reference distance L2.

First, when it is acquired a fact that the first stopped vehicle 3 is present within the predetermined range of the vehicle 2 from the vehicle detection unit 16, the notification control unit 18 commands the output device 9 to notify the presence of the stopped vehicle. Next, when a signal is received from the vehicle detection unit 16 that the first stopped vehicle 3 is present within the reference distance L2 from the vehicle 2, a signal is sent to the output device 9 requesting a notification including detailed information such as distances. Also, the notification control unit 18 acquires, from the communication vehicle-to-vehicle distance determination unit 17, the determination result based on the first inter-vehicle distance L1 between the vehicle 2 and the first stopped vehicle 3 and the second inter-vehicle distance L3 between the first stopped vehicle 3 and the second stopped vehicle 4. Based on the results, before the vehicle 2 comes within the reference distance L2 from the first stopped vehicle 3, the notification control unit 18 is configured to determine the type of notification when notifying the presence of the first stopped vehicle 3 and the second stopped vehicle 4 to the driver.

Specifically, when the second inter-vehicle distance L3 between the first stopped vehicle 3 and the second stopped vehicle 4 is smaller than the first predetermined distance L4, as illustrated in FIG. 1, the notification control unit 18 controls so as to notify the driver that there is a stopped vehicle within the predetermined range from the vehicle only for the first stopped vehicle 3 and to regulate a notification to the driver regarding the second stopped vehicle 4. That is, first, when the first stopped vehicle 3 has come within the reference distance L2 from the vehicle 2, the presence of the first stopped vehicle 3 is notified to the driver to call attention to it. Then, even when the second stopped vehicle 4 comes within the predetermined range from the vehicle 2 while notifying the driver of the presence of the first stopped vehicle 3, the notification control unit 18 regulates a series of notifications such as sound effects, marks, and distance display, and controls to continue only constant notifications, such as displaying only marks. Then, as illustrated in FIG. 1, the notification control unit 18 performs control such that the display of only marks is also finished before the vehicle 2 reaches the second stopped vehicle 4. The display of only marks may be configured to continue until the vehicle 2 reaches or passes the second stopped vehicle 4.

Further, when the inter-vehicle distance between the first stopped vehicle 3 and the second stopped vehicle 4 is equal to or greater than the first predetermined distance L4 and smaller than the second predetermined distance L5, as illustrated in FIG. 4, the notification control unit 18 is configured so that the notification that the first stopped vehicle 3 has come within the reference distance L2 from the vehicle 2 and the notification that the second stopped vehicle 4 has come within the reference distance L2 from the vehicle 2 are seamlessly continuous. For example, the notification control unit 18 performs control to continue to display only the marks or letters indicating the presence of the stopped vehicle even after the completion of the notification that the first stopped vehicle 3 is present within the reference distance L2. Then, when the second stopped vehicle 4 comes within the reference distance L2 from the vehicle 2, the notification control unit 18 is configured to issue a series of notifications such as generating effect sounds again and displaying on the display device 10 that the second stopped vehicle 4 is present within the reference distance L2. In other words, the presence of any of the stopped vehicles 3 and 4 is also notified to the driver, but is notified from the output device 9 so as not to make the driver feel uncomfortable. When the second inter-vehicle distance L3 between the first stopped vehicle 3 and the second stopped vehicle 4 is equal to or greater than the second predetermined distance L5, the notification control unit 18 controls the output device 9 to issue a series of notifications for each of the first stopped vehicle 3 and the second stopped vehicle 4 without any special notification.

Figure 5:
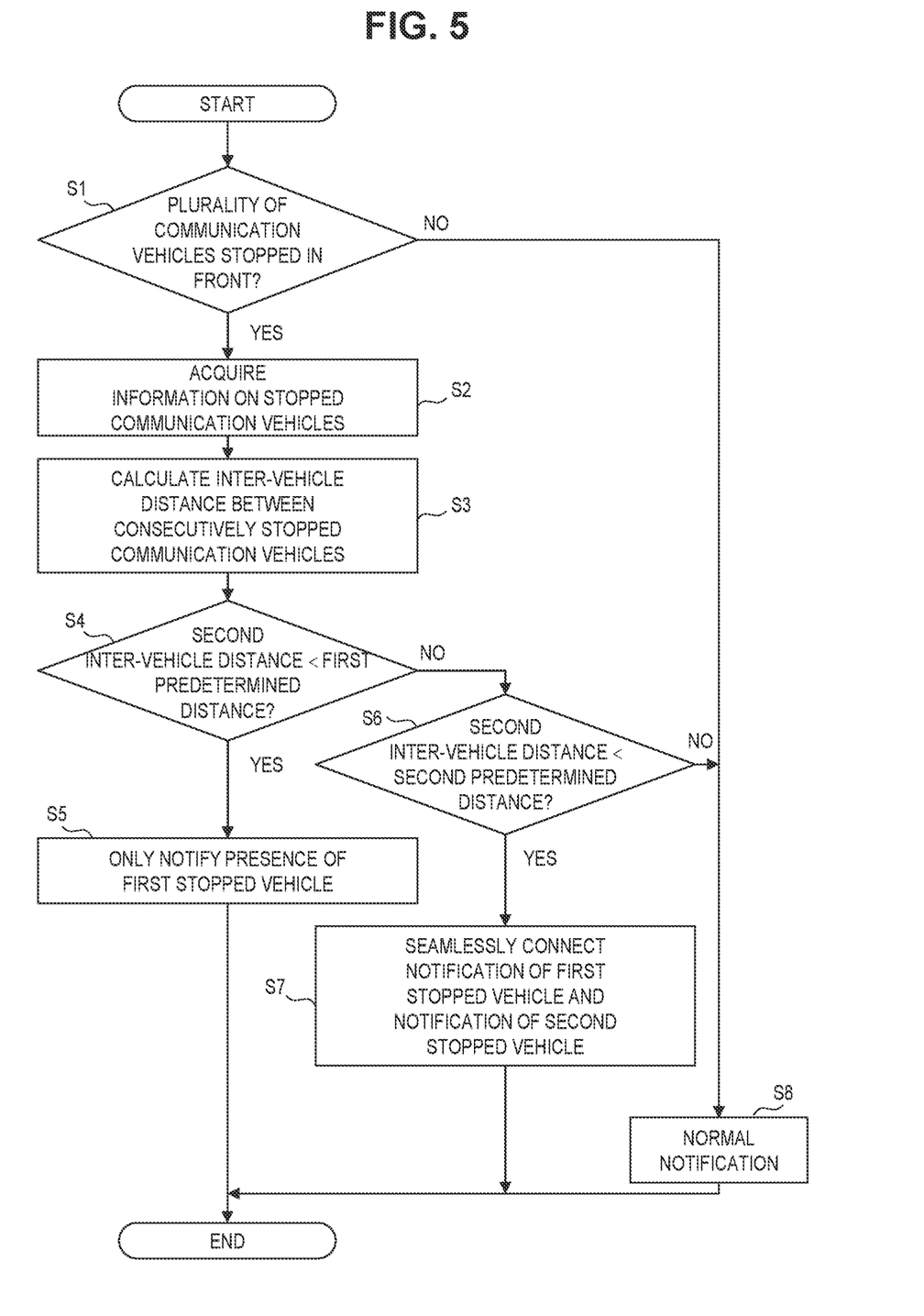
FIG. 5 is a flowchart for illustrating control executed by the driving support system for the vehicle according to an embodiment of the disclosure.

Next, an example of control executed by the driving support system 1 for a vehicle according to the embodiment of the present disclosure will be described with reference to the flowchart illustrated in FIG. 5. FIG. 5 is a flowchart that is executed when a stopped vehicle is present in front of the vehicle 2 in the travel direction within a predetermined reference distance L2 from the vehicle 2 and the presence of the stopped vehicle is notified to the driver.

First, the in-vehicle device 5 determines whether there is a plurality of stopped vehicles on the road in front of the vehicle 2 in the travel direction or on the lane in which the vehicle 2 is traveling (step S1). As described above, the in-vehicle device 5 acquires the current position of the vehicle 2 through the positioning antenna 6 of the vehicle 2 and receives information on other vehicles through the external communication antenna 8. In addition, the in-vehicle device 5 detects the azimuth angle, which is the travel direction of the vehicle 2, vehicle speed, and the like by the various sensors 7 mounted on the vehicle 2. These pieces of information are sent to the vehicle detection unit 16 of the vehicle 2, and the vehicle detection unit 16 compares the current position, azimuth angle, and the like of the vehicle 2 with the position information, vehicle speed, and the like of other vehicles to determine the presence of a stopped vehicle. When the vehicle detection unit 16 detects that there is only one stopped vehicle in front of the vehicle 2 in the travel direction among the other vehicles received through the external communication antenna 8, a negative determination is made in step S1, and the process proceeds to step S8. In addition, when acquiring the information on the stopped vehicle, the traveling lane in which the stopped vehicle is stopped and the aspect in which the vehicle is stopped are also acquired. From these pieces of information, information that can determine whether it is possible to avoid the stopped vehicles 3 and 4 while passing through them, or whether it is necessary to stop temporarily when the vehicle 2 approaches the first stopped vehicle 3 and the second stopped vehicle 4 is acquired.

In step S8, normal notification is performed by the notification control unit 18 and the output device 9. The normal notification here is, as illustrated in FIG. 6, a notification for notifying the driver that a stopped vehicle is present within the predetermined range in front of the vehicle 2 in the travel direction. The normal notification is a display on the display device 10 or output of an effect sound or beep sound from the speaker 11. Specifically, an effect sound such as a "ping" is sounded to prompt the driver to look at the display device 10 such as a display, and as illustrated in FIG. 6, a predetermined marks and the fact that the first stopped vehicle 3 is present in front of the vehicle 2 is notified through the display device 10. Then, when the first stopped vehicle 3 comes within the reference distance L2 of the vehicle 2, the distance from the vehicle 2 to the first stopped vehicle 3 is displayed and notified. When notifying, information on the stopped vehicles, the type of vehicle, and the reason for the stop may be displayed, or the presence of the stopped vehicle may be announced by voice. The notification continues until the vehicle 2 reaches or completely passes the stopped vehicle. Then, after the vehicle 2 passes the first stopped vehicle 3 and travels for a while, when the second stopped vehicle 4 comes within the predetermined range, it is configured to inform the driver of the presence of the second stopped vehicle 4 by issuing the normal notification.

Also, the travel direction of the vehicle 2 is not limited to the method described above. The travel direction of the vehicle 2 may be configured such that, for example, the travel direction of the vehicle 2 is predicted based on route settings or the like performed by car navigation, and information on the stopped vehicles in the travel direction is acquired. In addition, the fact that the first stopped vehicle 3 and the second stopped vehicle 4 are present is obtained by, for example, acquiring the position information such as the coordinates of the vehicles existing around the vehicle 2 multiple times by the external communication antenna 8, and then it may be determined that the vehicle is stopped based on the amount of movement per unit time of the position information.

When the determination in step S1 is affirmative because there is a plurality of stopped vehicles, the first stopped vehicle 3 and the second stopped vehicle 4, in front of the vehicle 2 in the travel direction, the process proceeds to step S2. In step S2, information including position information of the first stopped vehicle 3 and the second stopped vehicle 4 is transmitted from the vehicle detection unit 16 to the communication vehicle-to-vehicle distance determination unit 17. The communication vehicle-to-vehicle distance determination unit 17 calculates the second inter-vehicle distance L3 between the first stopped vehicle 3 and the second stopped vehicle 4 based on the acquired position information of the first stopped vehicle 3 and the second stopped vehicle 4 (step S3). Further, the communication vehicle-to-vehicle distance determination unit 17 stores a plurality of predetermined distances for distinguishing the length of the second inter-vehicle distance L3 between the first stopped vehicle 3 and the second stopped vehicle 4, and the communication vehicle-to-vehicle distance determination unit 17 compares the stored predetermined distances with the calculated second inter-vehicle distance L3.

That is, when the second inter-vehicle distance L3 is calculated, the process proceeds to step S4 to determine whether the second inter-vehicle distance L3 is smaller than the predetermined first predetermined distance L4. The first predetermined distance L4 is set to a distance smaller than the reference distance L2, for example, a distance at which the driver can easily recognize the second stopped vehicle 4 visually after passing the first stopped vehicle 3. When the second inter-vehicle distance L3 is smaller than the first predetermined distance L4 and the determination in step S4 is affirmative, the process proceeds to step S5.

In step S5, as illustrated in FIG. 1, by the notification control unit 18, the output device 9 is controlled to support the driver's driving such that the notification is output only for the first stopped vehicle 3, which is the closest stopped vehicle from the vehicle 2, and the notification for the second stopped vehicle 4 is restricted. In other words, because the second inter-vehicle distance L3 is smaller than the first predetermined distance L4 and the first stopped vehicle 3 and the second stopped vehicle 4 are close, when the same notification is executed for the second stopped vehicle 4, the driver may feel uncomfortable by the notification, or the driver may not be able to recognize accurate information. Therefore, such a situation is avoided by reducing the number of notifications. A similar notification here means that immediately after the vehicle 2 has passed the first stopped vehicle 3, information on the second stopped vehicle 4 is displayed by marks, distances, and the like along with effect sounds and beeps. When displayed like this, as the driver, for example, despite having passed the first stopped vehicle 3, information on the new second stopped vehicle 4 is suddenly notified along with effect sounds and the distance to the second stopped vehicle 4 displayed is small, so the driver may feel as described above.

In step S5, as illustrated in FIG. 1, first, the notification control unit 18 makes a normal notification similar to that of step S8 when the first stopped vehicle 3 has gone the reference distance L2. After the vehicle 2 has passed the first stopped vehicle 3, the output device 9 is controlled so that only the marks and the display indicating the presence of the second stopped vehicle 4 are continued. Alternatively, after the vehicle 2 has passed the first stopped vehicle 3, the notification may be made by changing the combination of sounds and displays so that the driver can correctly recognize the presence of the second stopped vehicle. Then, the notification control unit 18 erases the marks and the display indicating the presence of the second stopped vehicle 4 before the vehicle 2 reaches the second stopped vehicle 4, thereby once ending this flow. The marks and the display indicating the presence of the second stopped vehicle 4 may be displayed until the second stopped vehicle 4 is passed. That is, the notification control unit 18 assumes that the first stopped vehicle 3 and the second stopped vehicle 4 are stopped due to the same event, and performs control to recognize them as one obstacle and notify the driver of it.

Conversely, when the second inter-vehicle distance L3 between the first stopped vehicle 3 and the second stopped vehicle 4 is equal to or greater than the first predetermined distance L4 and the determination in step S4 is negative, the process proceeds to step S6. In step S6, it is determined whether the second inter-vehicle distance L3 is smaller than the second predetermined distance L5. The second predetermined distance L5 is, for example, a distance that is equal to or greater than the first predetermined distance L4 and greater than the reference distance L2, and is set to a distance that the second stopped vehicle 4 is barely visible to the driver when passing the first stopped vehicle 3. When the second inter-vehicle distance L3 is smaller than the second predetermined distance L5 and the determination in step S6 is affirmative, the process proceeds to step S7.

In step S7, as illustrated in FIG. 4, the notification control unit 18 performs normal notification in the same manner as in step S8 when the first stopped vehicle 3 has come within the reference distance L2. Then, even after the vehicle 2 has passed the first stopped vehicle 3, the marks and the display indicating the presence of the second stopped vehicle 4 continue, and then when the second stopped vehicle 4 has come within the reference distance L2 from the vehicle 2, the output device 9 is controlled so as to give a normal notification regarding the second stopped vehicle 4. That is, the notification control unit 18 performs control so as to seamlessly connect the notification regarding the first stopped vehicle 3 and the notification regarding the second stopped vehicle 4. In particular, the notification control unit 18 performs control to continue to display only the marks or characters indicating the presence of the stopped vehicle even after the completion of the notification that the first stopped vehicle 3 is present at the reference distance L2. Then, when the second stopped vehicle 4 comes within the reference distance L2 from the vehicle 2, the notification control unit 18 performs control to generate an effect sound again or display on the display device 10 such as a display that the second stopped vehicle 4 is present within the reference distance L2, or the like to perform a normal notification.

Conversely, when the second inter-vehicle distance L3 between the first stopped vehicle 3 and the second stopped vehicle 4 is equal to or greater than the second predetermined distance L5 and the determination in step S6 is negative, the process proceeds to step S8. In step S8, since the second inter-vehicle distance L3 is equal to or greater than the second predetermined distance L5 and the first stopped vehicle 3 and the second stopped vehicle 4 are sufficiently separated, even when normal notifications are sent to each of them, it is determined that there is a low possibility of annoying the driver or causing an error in recognition. Therefore, when the first stopped vehicle 3 comes within the reference distance L2 from the vehicle 2, a normal notification is given, and when the vehicle 2 passes the first stopped vehicle 3, the sound and the display on the display device 10 are terminated. Then, when the second stopped vehicle 4 comes within the reference distance L2 from the vehicle 2, a normal notification is given, and when the vehicle 2 passes the second stopped vehicle 4, the notification and the control end.

According to the driving support system for the vehicle, when there is a stopped vehicle, which is an obstacle, in front of the vehicle 2 in the travel direction and the first inter-vehicle distance L1 between the stopped vehicle and the vehicle 2 is smaller than the reference distance L2, the driver's driving is supported by notifying the driver of the presence of the stopped vehicle. In this case, when there is a plurality of stopped vehicles 3 and 4, the inter-vehicle distance between the stopped vehicles 3 and 4 is calculated, and the type of notification by the notification control unit 18 is determined based on the calculated second inter-vehicle distance L3. In particular, when the second inter-vehicle distance L3 is smaller than the first predetermined distance L4, a normal notification about the first stopped vehicle 3 is given, and after passing the first stopped vehicle 3, a notification about the second stopped vehicle 4 is restricted. That is, the notification about the second stopped vehicle 4 is suppressed in a state in which the distance from the vehicle 2 is short immediately after the vehicle 2 passes the first stopped vehicle 3. Therefore, it is possible to suppress or prevent the driver from being uncomfortable or misunderstood due to frequent notifications, and furthermore, it is possible to provide appropriate driving assistance to the driver. Also, when the second inter-vehicle distance L3 is equal to or greater than the first predetermined distance L4 and smaller than the second predetermined distance L5, a normal notification about the first stopped vehicle 3 is given to the driver, and then after the vehicle 2 passes the first stopped vehicle 3, only the notification by display is given until the reference distance L2. Then, when the second stopped vehicle 4 comes within the reference distance L2 from the vehicle 2, a normal notification is given to the driver. That is, the notification of the presence of the first stopped vehicle 3 and the notification of the presence of the second stopped vehicle are seamlessly continuous. Therefore, it is possible to prevent the notification based on the presence of the second stopped vehicle 4 from being displayed again immediately after the vehicle 2 passes the first stopped vehicle 3 and the notification disappears. As a result, similarly, it is possible to suppress or avoid the driver feeling annoyance or erroneously recognizing.

Although the embodiment of the present disclosure is described above, the present disclosure is not limited to the above example, and may be modified as appropriate within the scope of achieving the object of the present disclosure. For example, the information on the stopped vehicles 3 and 4 is not limited to vehicle-to-vehicle communication, and the control described above may be executed based on information obtained from infrastructure outside the vehicle. For example, through so-called road-to-vehicle communication in which VICS (registered trademark), which is a road traffic information communication system, or compatible devices such as roadside units installed on the road and the in-vehicle device 5 of the vehicle 2 perform two-way communication, it may be also possible to acquire information on obstacles on a planned travel route of the vehicle 2. Alternatively, information on obstacles may be acquired by transmitting information detected by sensors of other vehicles traveling around the vehicle 2 to the vehicle 2. In this case, even when the obstacle is not a vehicle, the control as described above can be executed.

Further, when it is clear from such road-to-vehicle communication that the first stopped vehicle 3 and the second stopped vehicle 4 have stopped due to the same event, it is not always necessary to select the notification type according to the predetermined distance. For example, when it is clear that the event is the same, if the second inter-vehicle distance L3 between the first stopped vehicle 3 and the second stopped vehicle 4 is smaller than the second predetermined distance L5, the same notification as when the second inter-vehicle distance L3 is smaller than the first predetermined distance L4 may be sent. In this case, the notification control unit 18 may, in addition to normal notifications, provide information on the details of the event and points to be noted by voice, for example. By doing so, even when the driver cannot visually see the second stopped vehicle 4 after passing the first stopped vehicle 3, the driver can recognize that the second stopped vehicle 4 will soon appear. When the driver recognizes that it is the same event, the notification of the presence of the second stopped vehicle 4 may rather cause the driver to feel uncomfortable. By regulating notifications regarding the presence of other obstacles, such discomfort to the driver can be suppressed or avoided, and it is possible to suppress or prevent the driver from being uncomfortable or from misunderstanding by frequent notifications.

Also, the reference distance L2, the first predetermined distance L4, and the second predetermined distance L5 may be determined according to the event. For example, when the first stopped vehicle 3 and the second stopped vehicle are present due to traffic congestion, the first predetermined distance L4 may be set relatively large. In the case of traffic congestion, the vehicle 2 must slow down sufficiently before it reaches the first stopped vehicle 3, so early notification to the driver allows the vehicle 2 to stop more safely. Further, the second predetermined distance L5 may be set to a distance greater than the first predetermined distance L4 and equal to or smaller than the reference distance L2. Even in that case, it is sufficient that the notification regarding the first stopped vehicle 3 and the notification regarding the second stopped vehicle 4 are notified seamlessly and continuously. For example, after passing the first stopped vehicle 3, the display may be continued while effect sounds or beeps are output, and only the distance display may be switched to the distance to the second stopped vehicle 4 and displayed.

Further, in the embodiment, vehicle-to-vehicle communication is performed by three vehicles, the vehicle 2, the first stopped vehicle 3, and the second stopped vehicle 4, but the support system may be executed by four or more vehicles including another vehicle stopped at a position farther than the second stopped vehicle 4. In that case, after executing the notification according to the inter-vehicle distance between the first stopped vehicle 3 and the second stopped vehicle 4, the notification may be made according to the inter-vehicle distance between the second stopped vehicle 4 and another stopped vehicle that is stopped in front of the second stopped vehicle 4 in the travel direction.

For example, when both the second inter-vehicle distance L3 between the first stopped vehicle 3 and the second stopped vehicle 4 and a third inter-vehicle distance between the second stopped vehicle 4 and another stopped vehicle are smaller than the first predetermined distance L4, the notification to the driver may be made only for the first stopped vehicle 3. That is, when the first stopped vehicle 3 comes within the reference distance L2 from the vehicle 2, the presence of the first stopped vehicle 3 is displayed on the display device 10 such as a display along with effect sounds and beeps. Further, only the display may be continued even after passing the first stopped vehicle 3, and the display may be ended before reaching another stopped vehicle.

Next, a case where the second inter-vehicle distance L3 between the first stopped vehicle 3 and the second stopped vehicle 4 is smaller than the first predetermined distance L4 and the inter-vehicle distance between the second stopped vehicle 4 and another stopped vehicle is equal to or greater than the first predetermined distance L4 and smaller than the second predetermined distance L5 will be described. In that case, first, when the first stopped vehicle 3 comes within the reference distance L2, a notification is started to the driver. Then, in the same way as the notification described above, the notification continues even after passing the first stopped vehicle 3, and the notification ends before reaching the second stopped vehicle 4. After passing the second stopped vehicle 4, when it is determined that another stopped vehicle is present within the reference distance L2 from the vehicle 2, a notification of the presence of another stopped vehicle is started to the driver. That is, the presence of another stopped vehicle is displayed on the display device 10 along with effect sounds or beeps, and the notification continues until the vehicle 2 passes another stopped vehicle. With such a configuration, a new notification due to the presence of the second stopped vehicle 4 or another stopped vehicle can be omitted, and the driver can surely recognize the presence of another stopped vehicle.

Further, although the embodiment is described as systems, they can be freely combined and implemented as long as there is no technical contradiction. Further, the processing described as being performed by one device may be shared and performed by a plurality of devices. Conversely, processing described as being performed by different devices may be performed by a single device. In the information processing system, it is possible to appropriately change the hardware configuration for realizing each function.

What is claimed is:

1. A driving support system for a vehicle configured for notifying a driver of the vehicle to selectively either temporary stop the vehicle at an obstacle or pass the obstacle, the driving support system comprising:
   a positioning antenna, a plurality of sensors, and an external communication antenna configured to acquire information including position information of the obstacle that obstructs traffic; and
   a processor configured to:
      acquire a current position of the vehicle via the positioning antenna;
      receive a plurality of information on the obstacle that obstructs traffic through the external communication antenna received from the obstacle that obstructs traffic;
      notify a driver of a presence of the obstacle when the obstacle is present within a predetermined range from the vehicle, based on peripheral information of the vehicle, the predetermined range is a distance that allows the driver of the vehicle to avoid the obstacle that obstructs traffic without making sudden operations;
      determine, when a plurality of obstacles is present within the predetermined range, whether an inter-obstacle distance between a first obstacle that is closest to the vehicle from among the obstacles, and a second obstacle other than the first obstacle is smaller than a first predetermined distance that is set in advance;
      analyze the plurality of information on the second obstacle to determine whether it is possible to avoid the first and second obstacles while passing through them, or whether it is necessary to stop temporarily when the vehicle approaches the first obstacle and the second obstacle is acquired;
      determine, when a distance between the first obstacle and the second obstacle is equal to or greater than the first predetermined distance, whether the distance is smaller than a second predetermined distance, the second predetermined distance is a distance greater than a reference distance, the reference distance is smaller than the predetermined range, the reference distance serving as a reference for starting a detailed notification of the presence of the obstacle to the vehicle and the first predetermined distance is smaller than the reference distance;
      control, when the distance between the first obstacle and the second obstacle is equal to or greater than the first predetermined distance and smaller than the second predetermined distance, a notification informing the driver of the presence of the first obstacle and a notification informing the driver of the presence of the second obstacle such that the notifications are continuous;
      when the distance between the first obstacle and the second obstacle is equal to or greater than the first predetermined distance and smaller than the second predetermined distance, perform control for continuing a notification even after the notification regarding the first obstacle ends until the notification regarding the second obstacle is started, such that the notifications are continuous;
      perform control for restricting a notification of a presence of the second obstacle to the driver when the inter-obstacle distance is smaller than the first predetermined distance.

2. The driving support system according to claim 1, wherein the processor is configured to continue a constant notification even after the vehicle passes the first obstacle and end the constant notification before the vehicle reaches the second obstacle.

3. The driving support system according to claim 1, wherein:
   the positioning antenna, the plurality of sensors, or the external communication antenna is configured to acquire a fact that the first obstacle and the second obstacle are present due to a same event; and
   the processor is configured to:
      determine whether the inter-obstacle distance is smaller than the second predetermined distance; and
      restrict the notification of the presence of the second obstacle when the first obstacle and the second obstacle are present due to the same event and the inter-obstacle distance is smaller than the second predetermined distance.

4. The driving support system according to claim 1, wherein:
   the first obstacle is a first stopped vehicle that is parked and is configured to communicate with the vehicle;
   the second obstacle is a second stopped vehicle that is parked and is configured to communicate with the vehicle; and
   the processor is configured to acquire information including position information from each of the first stopped vehicle and the second stopped vehicle through vehicle-to-vehicle communication.

5. The driving support system according to claim 1, wherein the processor is configured to emit an alarm as the notification from a speaker.

6. The driving support system according to claim 1, wherein:
   the processor is configured to display a distance to the obstacle as the notification on a display device.

* * * * *